United States Patent [19]

Povero

[11] 4,277,941
[45] Jul. 14, 1981

[54] DEVICE FOR THE REDUCTION OF THE EMISSION OF POLLUTANT GASES PRODUCED BY INTERNAL COMBUSTION, SPARK-IGNITION, ENGINES FOR MOTOR VEHICLES

[75] Inventor: Mario Povero, Poirino, Italy

[73] Assignee: Fiat Auto S.p.A., Turin, Italy

[21] Appl. No.: 43,602

[22] Filed: May 29, 1979

[30] Foreign Application Priority Data

Jul. 7, 1978 [IT] Italy ............................. 53526/78[U]

[51] Int. Cl.³ ............................................. F01N 3/10
[52] U.S. Cl. ...................................... 60/307; 60/293; 137/882
[58] Field of Search ................ 137/881, 882; 251/321, 251/323; 60/289, 290, 293, 307

[56] References Cited

U.S. PATENT DOCUMENTS

| 1,152,214 | 8/1915 | Phillips | 137/882 |
| 2,956,865 | 10/1960 | Williams | 60/307 |
| 3,246,641 | 4/1966 | Goehring | 137/882 |
| 3,413,803 | 12/1968 | Rosenlund | 60/282 |
| 3,581,490 | 6/1971 | Morris | 60/289 |
| 3,751,915 | 8/1973 | Ranft | 60/290 |
| 3,812,673 | 5/1974 | Muroki | 60/289 |
| 3,820,564 | 6/1974 | Wagner | 137/881 |
| 3,905,193 | 9/1975 | Heilman | 60/289 |
| 4,015,632 | 4/1977 | Frahm | 251/321 |

*Primary Examiner*—Douglas Hart
*Attorney, Agent, or Firm*—Sughrue, Rothwell, Mion, Zinn and Macpeak

[57] ABSTRACT

A device for supplying air into the exhaust gases of an internal combustion engine to promote complete combustion of carbon monoxide and hydrocarbons for the reduction of atmospheric pollution has a manually operable shut-off valve held open by a spring, which can be operated by a push-button to intercept the supply of air to an air feed pipe when making test measurements on the engine or tuning the carburettor.

3 Claims, 4 Drawing Figures

DEVICE FOR THE REDUCTION OF THE EMISSION OF POLLUTANT GASES PRODUCED BY INTERNAL COMBUSTION, SPARK-IGNITION, ENGINES FOR MOTOR VEHICLES

DESCRIPTION

The present invention relates to devices for reducing the emission of pollutant gases produced by an internal combustion engine, with spark ignition, for motor vehicles of the type including a feed pipe for supplying air to the engine exhaust ducts.

Such devices, by introducing atmospheric air into the exhaust gases downstream of the exhaust valves, achieve a post-combustion of the exhaust gases of the engine, thus completing the oxidation of the carbon monoxide and of the unburnt hydrocarbons present in the exhaust gases before the gases are discharged into the atmosphere.

During the operations of setting-up the engine, the engine is adjusted so as to reduce the emission of carbon monoxide to a minimum, and during the calibration of the carburettor, which is effected after a certain period of running of the engine, it is necessary to interrupt the supply of atmospheric air to the exhaust ducts, in order to avoid misleading measurements, and in order to allow correct adjustment of the carburettor.

In the devices of the prior art the pipe for feeding atmospheric air into the exhaust gases has an elastically yieldable portion, for example, of elastomeric material. The admission of air into the exhaust ducts may be interrupted by throttling the yieldable portion of the air feed pipe, by manual operation of a suitable gripper type tool which pinches the yieldable pipe portion.

The object of the present invention is to provide a device which will allow easier and more rapid interruption of the supply of air into the exhaust ducts, without recourse to special tools.

With a view to achieving this object, the present invention provides a device of the type referred to above, characterised in that the device further comprises a manually operable interception valve which controls the flow of air into the said feed pipe, the said interception valve being subject to the action of resilient means tending to keep said valve open.

The invention will now be described, by way of non-limiting example, with reference to the accompanying drawings, in which.

Figure 1:
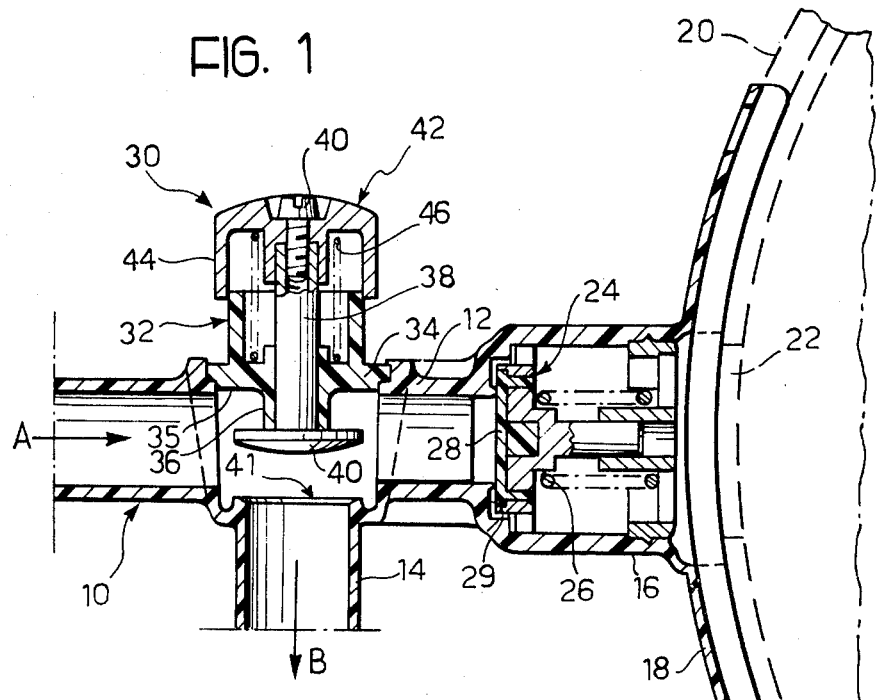
FIG. 1 is an axial sectional view of an interception valve according to one embodiment of the invention, in a first embodiment of an anti-pollution device according to the invention.
Figure 2:
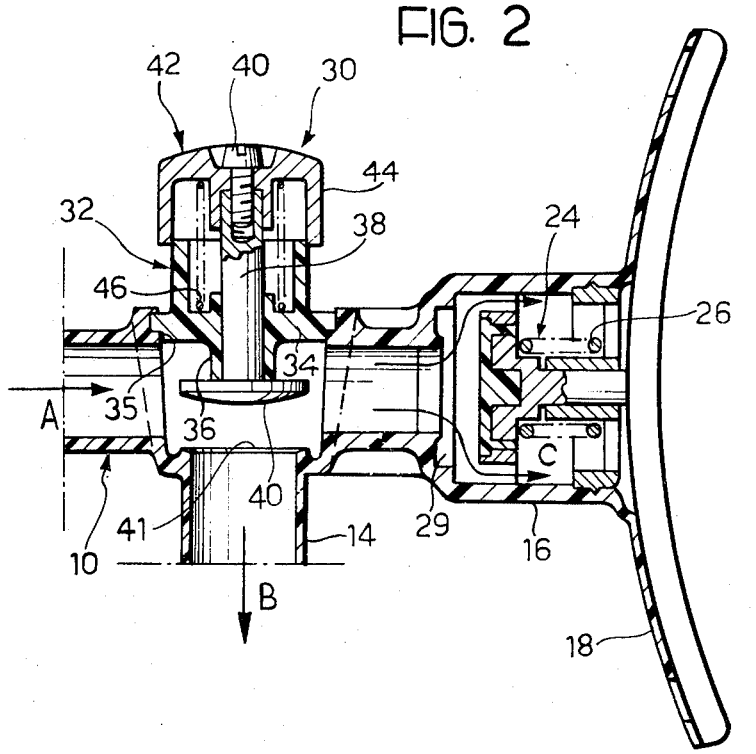
FIG. 2 and 3 are sectional views similar to FIG. 1, showing two successive stages of operation of the valve according to the invention.
Figure 3:
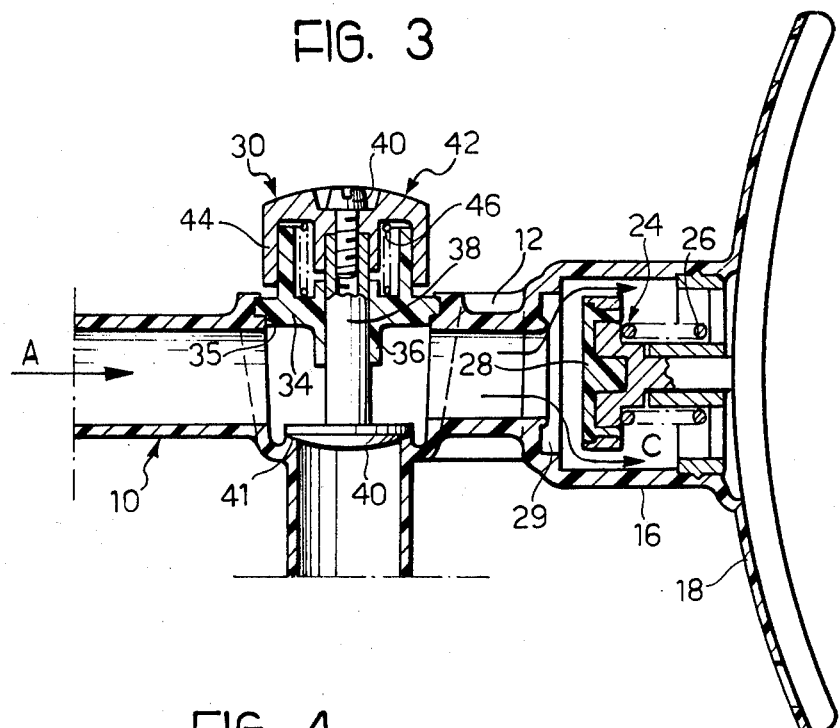

Referring to FIGS. 1 to 3, reference numeral 10 indicates a pipe for feeding air into the exhaust ducts (not shown) of a spark ignition internal combustion engine. The feed pipe 10 comprises first and second sections 12, 14, orthogonal to each other.

The first pipe section 12 is connected at one end to an air delivery pump of known kind, not illustrated in the drawings, driven by the engine. The other end of the first pipe section 12 has a radial enlargement 16 provided with a curved flange 18, connected to the side wall of a shell 20 which contains the air filter of the engine, upstream of the carburettor.

The side wall of the shell 20 has an aperture 22, coaxial with the pipe section 12, communicating with the pipe section 12 through an overpressure valve 24.

The valve 24 has a closure element 28 which is slidable axially against the action of a helical spring 26 within the enlargement 16 of the first pipe section 12. This valve closure element 28 cooperates with a valve seat 29 at the end of the enlargement 16 remote from the shell 20.

The second pipe section 14 is connected orthogonally to the lower part (as shown in FIGS. 1 and 2) of the wall of the first section 12, upstream of the valve 24. The pipe section 14 is coaxial with an interception valve 30 in a wall of the first pipe section 12 opposite the pipe section 14.

In the illustrated embodiment, the first section 12, the enlargement 16, the annular flange 18 and the second section 14 of the feed pipe 10 comprise one piece of moulded heat-resistant plastics material.

The interception valve 30 is a mushroom valve having a cup-shaped support body 32, moulded in plastics material, the bottom wall of which, shown as 34, is sealingly fitted into an aperture 35 in the wall of the first section 12 opposite the second section 14.

The bottom wall 34 of the support body 32 has a central axial sleeve 36 coaxial with the second pipe section 14, and communicating with the interior of the feed pipe 10. The sleeve 35 constitutes a guide for axial sliding movement of a valve stem 38 carrying at its inner end a valve head 40 which cooperates with an annular valve seat 41 located at the mouth of the second section 14. The valve stem 38 and head 40 are of metal or plastics material.

The outer end of the stem 38 is connected, via an axial screw 40, to a control push-button 42 having a cylindrical skirt 44 which is slidable axially upon the outer surface of the support body 32 against the action of a helical spring 46 which acts between the button 42 and the bottom wall 34 of the support body 32. The helical spring 46 urges the valve head 40 into the open position in which it is in direct abutment with the inner end of the sleeve 36.

In normal operation of the illustrated device according to the invention, air fed by the engine-driven delivery pump passes through the first section 12 of the feed pipe 10 in the direction of the arrow A, through the second section 14 in the direction of arrow B, and is delivered to the exhaust ducts leading from the cylinders of the engine, so as to carry out oxidation of carbon monoxide and unburnt hydrocarbons contained in the exhaust gases.

When the force on the valve closure element 28 due to pressure of air fed by the pump into the first section 12 is greater than the force exerted on the closure element 28 by the spring 26 the closure element 28 is moved away from the valve seat 29, allowing part of the air delivered by the pump to flow into the enlargement 16 in the direction of the arrows C, and to enter the air filter casing 29 through the aperture 22.

When it is necessary to carry out routine testing of the carbon monoxide content of the exhaust gases and to calibrate the carburettor, during the initial setting-up of the engine and after specific periods of running of the said engine, it is necessary to exclude additional air from the exhaust ducts. During such testing, therefore, all the air fed from the delivery pump is fed into the filter casing 20 of the air filter, by manually depressing the control pushbutton 42 so as to close off the mouth of the second pipe section 14 by the valve head 40, cutting off the exhaust ducts from the air delivery. When testing has been completed the device is allowed to return to its normal operating condition, by releasing the push-button 42, so that the helical spring 46 moves the interception valve head 40 back into its open position, shown in FIGS. 1 and 2.

Figure 4:
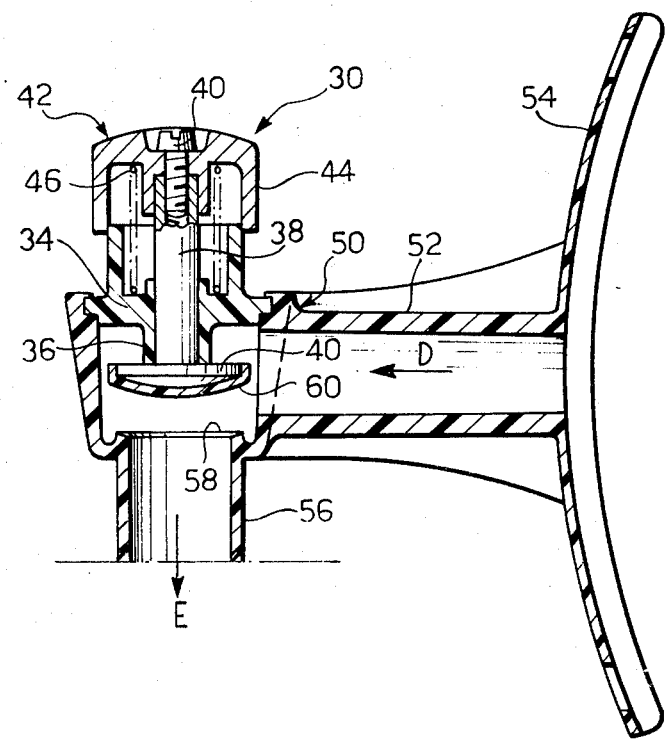
FIG. 4 is an axial section view of the interception valve shown in FIGS. 1 to 3 in an anti-pollution device according to a second embodiment of the invention.

FIG. 4 shows an interception valve 30 similar to that shown in FIGS. 1 to 3 in its application to an anti-pollution device different from that illustrated in FIGS. 1 to 3.

In the device of FIG. 4 the air-feed pipe indicated 50, consists of a first section 52 connected at one end to an annular curved flange 54, similar to the flange 18 previously described, one end of the first pipe section 52 communicating directly with the interior of the air filter casing 20 and the opposite end of the first pipe section 52 with a second pipe section 56. The second pipe section is orthogonal to the first section 52, and is coaxial with the interception valve 30, in the opposite wall of the first section from the interception valve 30.

The interception valve 30 is the same as that previously described with reference to the FIGS. 1 to 3, except for the fact that the face of the valve head 40 facing towards the second section 56 is covered with a layer 60 of heat-resistant rubber. The second pipe section 56 communicates with the exhaust ducts of the engine cylinders, not shown, under control of a further push-button control valve, not shown.

During normal operation of the device shown in FIG. 4, air for supporting postcombustion in the exhaust gases is drawn directly from the air filter, due to the sub-atmospheric pressure induced by the exhaust gases. This air passes through the first pipe section 52 in the direction of the arrow D and the second pipe section 56 in the direction of the arrow E, to flow into the engine exhaust ducts.

In order to effect testing of the degree of control of the emission of carbon monoxide in the exhaust gases, and calibration of the carburettor, the push-button 42 is depressed to hold the valve 30 in its closed position in which the valve head 40 makes sealing contact with a valve seat 58 at the mouth of the second pipe section 56. The layer of heat-resistant rubber 60 on the valve head 40 protects the valve head 40 and the rod 38 of the valve 30, made of moulded plastics material, from possible leakage of exhaust gases through the second pipe section 56 in the event of faulty functioning of the push-button interception valve 30.

At the end of the aforesaid testing operations, the push-button 42 is released, allowing the spring 46 to return the rod 40 and therefore the valve head 40 to its open position, similarly to what has already been described with reference to FIGS. 1 to 3.

What is claimed is:

1. A device for reducing the emission of pollutant gases from a spark ignition internal combustion engine for motor vehicles comprising an air-feed pipe for connection to exhaust ducts of said engine for the supply of air thereto, said air-feed pipe being comprised of first and second sections of integral one-piece construction disposed at right angles to each other with one end of said first section being adapted to be connected to said exhaust ducts, fitting means secured to one end of said second section for connection to the air intake of said engine and a manually operable interception valve secured in said air-feed pipe adjacent the opposite ends of said first and second sections for controlling communication therebetween, said opposite end of said first section defining a valve seat for cooperation with said valve upon manual operation thereof to prevent communication between said first and second sections and resilient means acting on said valve for normally maintaining said valve spaced from said valve seat to provide communication between said first and second sections.

2. The device defined in claim 1 wherein said air-feed pipe is comprised of a third section of integral one-piece construction with said first and second sections and disposed in coaxial alignment with said second section and spaced therefrom, one end of said third section being adapted to be connected to an air pump with the opposite end of said third section being disposed in communication with said first and second sections when said valve is spaced from said valve seat and being disposed in communication with said second section when said valve is disposed in engagement with said valve seat and pressure relief valve means located within said second section for relieving the air pressure supplied by said air pump when said valve is disposed in engagement with said valve seat.

3. The device defined in claim 1, wherein the interception valve is of the mushroom-head kind, comprising a valve head and a valve stem, a cup-shaped support body having a bottom wall fitted sealingly to a wall of said air-feed pipe, an axial sleeve supported by said bottom wall and acting as a guide for axial sliding movement of the valve stem and a control push-button fixed to the outer end of the valve stem and having a cylindrical skirt slidable upon the outer surface of the support body, against the action of said resilient means, which react elastically between said control push-button and the bottom wall of the support body, and a valve seat in the air-feed pipe, and valve head cooperating with said valve seat.

* * * * *